(12) United States Patent
Lee et al.

(10) Patent No.: US 11,837,383 B2
(45) Date of Patent: Dec. 5, 2023

(54) CABLES WITH IMPROVED COVERINGS TO REDUCE SHRINKBACK AND METHODS OF FORMING THE SAME

(71) Applicant: Prysmian S.p.A., Milan (IT)

(72) Inventors: Elliot Byunghwa Lee, Carmel, IN (US); Timothy John Clancy, Carmel, IN (US); Eric W. Bates, Lafayette, IN (US)

(73) Assignee: Prysmian S.p.A., Milan (IT)

( * ) Notice: Subject to any disclaimer, the term of this patent is extended or adjusted under 35 U.S.C. 154(b) by 563 days.

(21) Appl. No.: 16/832,499

(22) Filed: Mar. 27, 2020

(65) Prior Publication Data
US 2021/0304916 A1    Sep. 30, 2021

(51) Int. Cl.
*H01B 3/44* (2006.01)
*B29C 48/154* (2019.01)
(Continued)

(52) U.S. Cl.
CPC ............. *H01B 3/441* (2013.01); *B29C 48/06* (2019.02); *B29C 48/154* (2019.02); *C08L 23/06* (2013.01); *H01B 7/02* (2013.01); *H01B 13/148* (2013.01); *B29C 48/022* (2019.02); *B29K 2023/065* (2013.01); *B29K 2023/0616* (2013.01); *B29K 2023/0625* (2013.01);
(Continued)

(58) Field of Classification Search
CPC . H01B 3/30; H01B 3/44; H01B 3/441; H01B 7/02; H01B 13/148; H01B 7/17; B29C 48/154; B29C 48/06; B29C 48/022; C08L 23/06; C08L 2203/202; C08L 23/04; B29K 2023/0616; B29K 2023/0625; B29K 2023/0633; B29K 2023/065; B29K 2023/0675; B29K 2023/0683; B29K 2023/08; B29K 2995/0005; B29K 2995/0007; B29K 2995/0077; B29K 2995/0096; B29L 2031/3462
See application file for complete search history.

(56) References Cited

U.S. PATENT DOCUMENTS 6,228,446 B1 *  5/2001  Moffitt .................. B32B 5/18
                                                       428/36.5
6,399,191 B1 *  6/2002  Wong .................. C09D 123/04
                                                       427/407.1
(Continued)

FOREIGN PATENT DOCUMENTS

CN          104231412        * 12/2014
CN          104231412 A        12/2014
(Continued)

OTHER PUBLICATIONS

The Dow Chemical Company; Silane Crosslinking of Low Voltage Wire and Cable Applications of Engage ENR 7256.00 / LLDPE Blend; published Aug. 2005; 5 pages.
(Continued)

*Primary Examiner* — Jeffrey M Wollschlager
(74) *Attorney, Agent, or Firm* — Frost Brown Todd LLP

(57) ABSTRACT

A cable includes cable one or more conductors and a covering surrounding the one or more conductors. The covering is formed from a composition including polyethylene and a polyolefin elastomer, where the composition is crosslinked. A method of forming the cable is also provided.

6 Claims, 1 Drawing Sheet

(51) Int. Cl.
*B29C 48/06* (2019.01)
*C08L 23/06* (2006.01)
*H01B 7/02* (2006.01)
*H01B 13/14* (2006.01)
*B29C 48/00* (2019.01)
*B29K 23/00* (2006.01)
*B29L 31/34* (2006.01)

(52) U.S. Cl.
CPC ............... *B29K 2023/0633* (2013.01); *B29K 2023/0675* (2013.01); *B29K 2023/0683* (2013.01); *B29K 2023/08* (2013.01); *B29K 2995/0005* (2013.01); *B29K 2995/0007* (2013.01); *B29K 2995/0077* (2013.01); *B29K 2995/0096* (2013.01); *B29L 2031/3462* (2013.01); *C08L 2203/202* (2013.01)

(56) References Cited

U.S. PATENT DOCUMENTS

| | | | |
|---|---|---|---|
| 10,669,412 B2* | 6/2020 | Delineau | C08L 23/06 |
| 2010/0181092 A1* | 7/2010 | Cree | H01B 3/441 |
| | | | 174/110 SR |
| 2013/0323383 A1* | 12/2013 | Nazir | B01D 69/148 |
| | | | 426/442 |
| 2015/0376369 A1 | 12/2015 | Ranganathan et al. | |
| 2016/0189829 A1 | 6/2016 | Bates et al. | |
| 2017/0145131 A1* | 5/2017 | Ranganathan | C08J 3/24 |

FOREIGN PATENT DOCUMENTS

| | | | |
|---|---|---|---|
| CN | 108586912 | * | 9/2018 |
| CN | 108586912 A | | 9/2018 |
| CN | 109438820 | * | 3/2019 |
| EP | 0587453 A2 | | 3/1994 |
| GB | 2181437 A | | 4/1987 |
| WO | 2009002845 A1 | | 12/2008 |
| WO | WO2018046098 | * | 3/2018 |

OTHER PUBLICATIONS

Marsitzky, Dirk; Extended European Search Report issued in European Patent Application No. 21160225.5; dated Aug. 27, 2021; 6 pages.

* cited by examiner

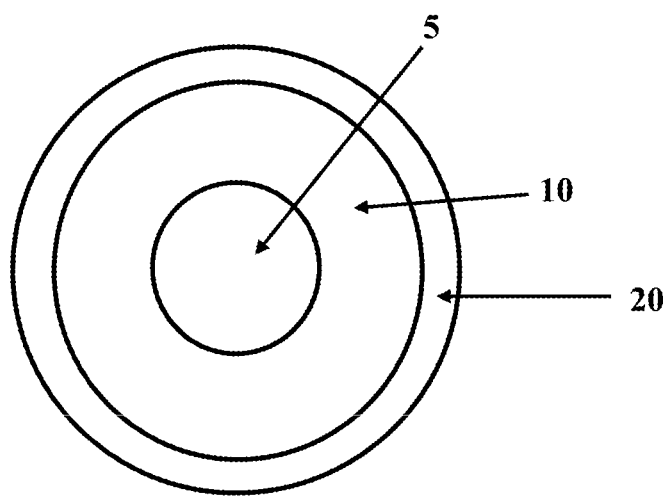

CABLES WITH IMPROVED COVERINGS TO REDUCE SHRINKBACK AND METHODS OF FORMING THE SAME

FIELD OF THE INVENTION

The present application relates to a cable having an improved covering. More specifically, the cable having an improved covering is formed from a composition including a polyethylene-polyolefin elastomer blend that allows for reduced shrinkback and improved curing at ambient temperatures.

BACKGROUND OF THE INVENTION

Cables generally include one or more coverings surrounding conductive elements to provide the cables such features as electrical insulation and improved durability. The coverings, usually in the form of insulation and jackets, are typically formed from polymers which exhibit properties suitable for the intended use of the cable. Suitable polymers can exhibit favorable properties—elongation at break percentages, tensile strengths, adherence—and possess the ability to be crosslinked. Silane crosslinking processes are often employed to effect such crosslinking because of their relative simplicity and low manufacturing costs. However, cables with coverings formed from compositions crosslinked by such processes have been known to suffer from shrinkback when exposed to high temperatures and/or subjected to fast extrusion line speeds. Shrinkback can lead to the conductive elements being openly exposed to the environment and ambient conditions and can further result in excessive leakage currents and connected system failures. It would be desirable to identify compositions from which covering can be formed that can be effectively crosslinked by silane crosslinking processes that meet industry standards and do not exhibit shrinkback when used in cable applications. It would also be desirable for such compositions exhibit improved curing at ambient temperatures.

British Patent No. GB 2181437 to Hanisch et al. ("Hanisch") describes that polymers used for a covering in elongated products can consist of a linear low-density polyethylene ("LLDPE") having a density of 0.88 to 0.95 g/cm$^3$, which can be moisture cured after grafting one of an unsaturated silane. However, Hanisch does not identify compositions that address the shrinkback issues described above.

European Patent No. EP 0587453 to Goncalves et al. ("Goncalves") describes that polyethylene (e.g., low-density polyethylene ("LDPE"), LLDPE, or co-polymeric polyethylene of ethylene vinyl acetate ("EVA")) may be modified with polypropylene for application of the SIOPLAS™ crosslinking process. According to Goncalves, the polyethylene-polypropylene blend can help to reduce contraction of the insulation, which may occur at an operating temperature of 130° C. However, Goncalves fails to disclose the polyethylene-polyolefin elastomer blend described herein.

Blends of polyethylene-polyolefin elastomer blend have been described in the art, but not in the context of addressing the shrinkback issues described herein. Furthermore, such known blends include a significantly larger proportion of polyolefin elastomer than that which is described herein.

SUMMARY OF THE INVENTION

Accordingly, an exemplary embodiment of the present invention provides a cable comprising one or more conductors; and a covering surrounding the one or more conductors. The covering is formed from a composition comprising polyethylene and about 10% to about 20%, by weight, of a polyolefin elastomer comprising one of more of an ethylene-octene copolymer, an ethylene-butene copolymer, an ethylene-propylene rubber ("EPR"), and ethylene-propylene-diene monomer ("EPDM"), wherein the composition is crosslinked.

The present invention may also provide a method of forming a cable comprising providing one or more conductors; combining polyethylene, about 5% to about 30%, by weight, of a polyolefin elastomer, and a silane coupling agent to form a crosslinkable composition; extruding the crosslinkable composition around the one or more conductors; and crosslinking the crosslinkable composition, wherein the crosslinked composition forms a covering.

The present invention may also provide a cable comprising one or more conductors; and a covering surrounding the one or more conductors. The covering is formed from a composition comprising polyethylene and about 5% to about 30%, by weight, of a polyolefin elastomer, wherein the composition is crosslinked.

Other objects, advantages and salient features of the invention will become apparent from the following detailed description, which, taken in conjunction with the annexed drawings, discloses embodiments of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 1 depicts a cross-sectional view of a cable having a conductor, an insulation layer, and a jacket layer according to one embodiment.

DETAILED DESCRIPTION OF THE EXEMPLARY EMBODIMENTS

As will be described herein, a composition is disclosed which is useful for the formation of one or more coverings in a cable including cable insulation layers and cable jacket layers. Cables including insulation and/or jacket layers formed from the described compositions can meet strict qualifications including those relating to shrinkback according to Underwriter Laboratory ("UL") 44 ed. 19 (2018). Such cables can also pass the Hot Creep Test at 150° C. and the Deformation Test according to UL 44 ed. 19 (2018). Generally, the compositions exhibiting such properties can be crosslinked compositions formed of a blend of polyethylene and a polyolefin elastomer.

In certain embodiments, suitable polyethylene polymers can include LDPE, very low-density polyethylene ("VLDPE"), high-density polyethylene ("HDPE"), high molecular weight polyethylene ("HMWPE"), ultra-high molecular weight polyethylene ("UHMWPE"), and LLDPE.

According to certain embodiments, the composition comprises LLDPE. As can be appreciated, suitable LLDPE polymers can alternatively be commercially obtained from, or be producible from polymers obtained from, suppliers such as LyondellBasell Industries N.V. (e.g., Integrate®, Luflexen®, Lupolen®, Microthene®, and Petrothene® grade LLDPE polymers), Chevron Phillips Chemical (e.g., Marlex® grade LLDPE polymers), Nova Chemicals (e.g., Sclair® and Novapol® grade LLDPE polymers), Exxon- Mobil Chemical, Ineos (e.g., Enable® and Eltex® grade LLDPE polymers), Dow Chemical Co. (e.g., Tuflin™ grade LLDPE polymers), Univation Technologies (e.g., XCAT' grade LLDPE polymers), Sabic, and Versalis S.p.A (e.g., Flexirene® grade LLDPE polymers).

Applicant has unexpectedly discovered that including certain amounts of certain polyolefin elastomers in a blend with polyethylene can provide reduced shrinkback with regard to cable coverings formed from compositions including such blends. Similarly, such blends can also realize improved curing at ambient temperatures. Suitable polyolefin elastomers can include ethylene-octene copolymer, an ethylene-butene copolymer, an ethylene-propylene rubber ("EPR"), and ethylene-propylene-diene monomer ("EPDM"), or combinations thereof.

In certain embodiments, the composition comprises about 5% to about 30%, by weight, of the polyolefin elastomer; in certain embodiments, the composition comprises about 6% to about 28%, by weight, of the polyolefin elastomer; in certain embodiments, the composition comprises about 7% to about 26%, by weight, of the polyolefin elastomer; in certain embodiments, the composition comprises about 8% to about 24%, by weight, of the polyolefin elastomer; in certain embodiments, the composition comprises about 9% to about 22%, by weight, of the polyolefin elastomer; and in certain embodiments, the composition comprises about 10% to about 20%, by weight, of the polyolefin elastomer.

Without wishing to be bound by theory, it is believed that using too little of the polyolefin elastomer can negatively impact the ability of the cable to pass the Hot Creep Test at 150° C. and the Deformation Test according to UL 44 ed. 19 (2018), as the polyolefin elastomer can accelerate the rate of cure, thereby facilitating the ability of the cable to meet technical requirements in a shorter period of time. Conversely, it is believed that using too much of the polyolefin elastomer can, in addition to increasing the cost of the cable, cause the covering to cure too quickly, thereby resulting in a rough surface.

The compositions described herein can further include silane coupling agents and other crosslinking agents. Generally, examples of suitable silane coupling agents can include one or more of a monomeric vinyl silane, an oligomeric vinyl silane, a polymeric vinyl silane, and an organosilane compound. Examples of suitable organosilane compounds can include γ-methacryloxypropyltrimethoxysilane, methyltriethoxysilane, methyltris(2-methoxyethoxy) silane, dimethyldiethoxysilane, vinyltris(2-methoxyethoxy) silane, vinyltrimethoxysilane, vinyltriethoxysilane, octyltriethoxysilane, isobutyltriethoxysilane, isobutyltrimethoxysilane, propyltriethoxysilane, vinyl triacetoxy silane, and mixtures or polymers thereof. As can be appreciated, suitable silane coupling agents can be commercially obtained from suppliers such as Evonik Industries AG (e.g., Dynasylan® SILFIN 75).

In certain embodiments, the compositions can comprise from about 0.5% to about 1.5%, by weight, of the silane coupling agent; in certain embodiments, the compositions can comprise from about 0.6% to about 1.4%, by weight, of the silane coupling agent; in certain embodiments, the compositions can comprise from about 0.7% to about 1.3%, by weight, of the silane coupling agent; in certain embodiments, the compositions can comprise from about 0.8% to about 1.2%, by weight, of the silane coupling agent; and in certain embodiments, the compositions can comprise from about 0.9% to about 1.1%, by weight, of the silane coupling agent.

Examples of suitable peroxide crosslinking compounds can include α,α'-bis(tert-butylperoxy) disopropylbenzene, di(tert-butylperoxyisopropyl)benzene, dicumyl peroxide, and tert-butylcumyl peroxide. Blends of multiple peroxide crosslinking agents can also be used, including, for example, a blend of 1,1-dimethylethyl 1-methyl-1-phenylethyl peroxide, bis(1-methyl-1-phenylethyl) peroxide, and [1,3 (or 1,4)-phenylenebis(1-methylethylidene)]bis(1,1-dimethylethyl) peroxide.

As can be appreciated, the compositions described herein can optionally further include additional components. For example, the compositions can include processing aids, antioxidants, and stabilizers in various embodiments. As can be appreciated, any of the additional components can be directly added to the compositions described herein or can be introduced using a masterbatch. Generally, any additional components can be included at about 1% to about 15%, by weight, of the compositions; in certain embodiments, the additional components can be added at about 2% to about 14%, by weight, of the compositions; in certain embodiments, the additional components can be added at about 4% to about 13%, by weight, of the compositions; in certain embodiments, the additional components can be added at about 5% to about 12%, by weight, of the compositions; in certain embodiments, the additional components can be added at about 6% to about 11%, by weight, of the compositions; and in certain embodiments, the additional components can be added at about 7% to about 10%, by weight, of the compositions.

A processing aid can be included to improve the processability of a composition by forming a microscopic dispersed phase within a polymer carrier. During processing, the applied shear can separate the processing aid (e.g., processing oil) phase from the carrier polymer phase. The processing aid can then migrate to the die wall to gradually form a continuous coating layer to reduce the backpressure of the extruder and reduce friction during extrusion. The processing oil can generally be a lubricant, such as ultra-low molecular weight polyethylene (e.g., polyethylene wax), stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or combinations thereof. In certain embodiments, a lubricant can be included from about 1 part to about 3 parts, by weight, of the composition. In certain embodiments, the processing aid can be a blend of LLDPE and one or more fluoropolymers. As can be appreciated, suitable processing aids can be commercially obtained from suppliers such as Chevron Phillips Chemical Company (e.g., Marlex® grade polymers).

In certain embodiments, a processing oil can alternatively be a blend of fatty acids, such as the commercially available products: Struktol® produced by Struktol Company of America (Stow, Ohio), Akulon® Ultraflow produced by DSM N.V. (Birmingham, Mich.), MoldWiz® produced by Axel Plastics Research Laboratories (Woodside, N.Y.), and Aflux® produced by Rhein Chemie (Chardon, Ohio).

According to certain embodiments, suitable antioxidants for inclusion in the composition can include, for example, amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl) propionate], 4,4'-thiobis(2-tert-butyl-5-methylphenol), 2,2'-thiobis(4-methyl-6-tert-butyl-phenol), benzenepropanoic acid, 3,5-bis(1,1-dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxy-hydrocinnamic acid C7-9-branched alkyl ester, 2,4-dimethyl-6-t-butylphenol tetrakis{methylene-3-(3',5'-ditert-butyl-4'-hydroxyphenol)propionate}methane or tetrakis {methylene3-(3',5'-ditert-butyl-4'-hydrocinnamate}methane, 1,1,3tris(2-methyl-4-hydroxyl-5-butylphenyl)butane, 2,5,di t-amyl hydroquinone, 1,3,5-tri methyl2,4,6tris(3,5di tert butyl-4-hydroxybenzyl)benzene, 1,3,5tris(3,5di-tert-butyl-4-hydroxybenzyl)isocyanurate, 2,2-methylene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butylphenol), tri-ethyleneglycol bis{3-(3-t-butyl-4-hydroxy-5methylphenyl) propionate}, 1,3,5-tris(4tert-butyl-3-hydroxy-2,6-dimethylbenzyl)-1,3,5-triazine-2,4,6-(1H,3H,5H)trione, 2,2-methylenebis{6-(1-methylcyclohexyl)-p-cresol}; sterically hindered phenolic antioxidants such as pentaerythritol tetrakis(3-(3,5-di-tert-butyl-4-hydroxyphenyl)propionate); hydrolytically stable phosphite antioxidants such as tris(2,4-ditert-butylphenyl)phosphite; toluimidazole, and/or sulfur antioxidants, such as bis(2-methyl-4-(3-n-alkylthiopropio-nyloxy)-5-t-butylphenyl)sulfide, 2-mercaptobenzimidazole and its zinc salts, pentaerythritol-tetrakis(3-lauryl-thiopropionate), and combinations thereof. Antioxidants can be included in compositions at concentrations about 7 parts, by weight, or less of the composition in certain embodiments; from about 1 part to about 5 parts, by weight, in certain embodiments; and from about 1 part to about 3 parts, by weight, in certain embodiments. As can be appreciated, it can be advantageous in certain embodiments to use a blend of multiple antioxidants such as, for example, a blend of toluimidazole and a second antioxidant or a blend of a primary phenolic antioxidant and one or more additional antioxidants.

According to certain embodiments, the compositions described herein can include one or more of an ultraviolet ("UV") stabilizer, a light stabilizer, a heat stabilizer, a lead stabilizer, a metal deactivator, and any other suitable stabilizer.

Suitable UV stabilizers can be selected from, for example, compounds including: benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations thereof. Specific examples of UV stabilizers can include 2,2"-methyl-enebis(6-(2H-benzotriazol-2-yl)-4-4(1,1,3,3-tetramethyl-butyl) phenol, available as LA-31 RG from Adeka Palmarole (Saint Louis, France) having CAS #103597-45-1; and 2,2'-(p-phenylene) bis-4-H-3,1-benzoxazin-4-one, available as Cyasorb UV-3638 from Cytec Industries (Stamford, Conn.) and having CAS #18600-59-4.

Hindered amine light stabilizers ("HALS") can be used as a light stabilizer according to certain embodiments. HALS can include, for example, bis(2,2,6,6-tetramethyl-4-piperidyl)sebaceate; bis(1,2,2,6,6-tetramethyl-4-piperidyl)sebaceate with methyl 1,2,2,6,6-tetrameth-yl-4-piperidyl sebaceate; 1,6-hexanediamine, N,N'-bis(2,2,6,6-tetramethyl-4-piperidyl)polymer with 2,4,6 trichloro-1,3,5-triazine; reaction products with N-butyl2,2,6,6-tetramethyl-4-piperidinamine; decanedioic acid; bis(2,2,6,6-tetramethyl-1-(octyloxy)-4-piperidyl)ester; reaction products with 1,1-dimethylethylhydroperoxide and octane; triazine derivatives; butanedioc acid; dimethylester, polymer with 4-hydroxy-2,2,6,6-tetramethyl-1-piperidine ethanol; 1,3,5-triazine-2,4,6-triamine,N,N'''-[1,2-ethane-diyl-bis[[[4,6-bis-[butyl(1,2,2,6,6pentamethyl-4-piperadinyl)amino]-1,3,5-tri-azine-2-yl]imino-]-3,1-propanediy]]bis[N',N"-dibutyl-N',N"bis(2,2,6,6-tetramethyl-4-pipe-ridyl); bis (1,2,2,6,6-pentamethyl-4-piperidinyl) sebacate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxy-phenyl) propionate. In one embodiment, a suitable HALS can be bis(1,2,2,6,6-pentamethyl-4-piperidinyl) sebacate.

Suitable heat stabilizers can include 4,6-bis (octylthiomethyl)-o-cresol dioctadecyl 3,3'-thiodipropionate; poly[[6-[(1,1,3,3-terramethylbutyl)amino]-1,3,5-triazine-2,4-diyl] [2,2,6,6-tetramethyl-4-piperidinyl)imino]-1,6-hexanediyl [(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to certain embodiments, the heat stabilizer can be 4,6-bis (octylthiomethyl)-o-cresol; dioctadecyl 3,3'-thiodipropionate and/or poly[[6-[(1,1,3,3-terramethylbutyl)amino]-1,3, 5-triazine-2,4-diyl][2,2,6,6-tetramethyl-4-piperidinyl) imino]-1,6-hexanediyl[(2,2,6,6-tetramethyl-4-piperidinyl) imino]].

A lead stabilizer can include a lead oxide, such as for example, red lead oxide $Pb_3O_4$. However, as will be appreciated, any other suitable lead stabilizer can also be used alone or in combination with red lead oxide. In some embodiments, however, the composition can alternatively be substantially lead-free. As will be appreciated, lead-free compositions can be advantageous for safety reasons and can allow for wider usage of the compositions.

As can be appreciated, in certain embodiments, a covering can be prepared by blending the components/ingredients of the above-described compositions in conventional masticating equipment. Suitable blending or mixing equipment can provide a sufficient degree of distributive and dispersive mixing. For example, a rubber mill, brabender mixer, banbury mixer, buss ko-kneader, farrel continuous mixer, or twin screw continuous mixer. In certain examples, some of the components can be premixed before the addition of others. The mixing time can be selected to ensure a homogenous mixture.

The compositions described herein can be extruded around a conductor to form a covering having advantageous properties. In a typical extrusion method, an optionally heated conductor can be pulled through a heated extrusion die, generally a cross-head die, to apply a layer of a melted composition onto the conductor. Upon exiting the die, the conductor with the applied composition can be passed through a heated vulcanizing section, or continuous vulcanizing section and then a cooling section, generally an elongated cooling bath, to cool. In certain embodiments, multiple polymer layers can be applied by consecutive extrusion steps in which an additional layer is added in each step. However, as can be appreciated, alternative extrusion methods can also be used. For example, in some embodiments, a tandem extrusion curing process can be used. In a tandem extrusion curing process, each of the various polymer layers are extruded individually and then all of the polymer layers are cured in a single curing step. Alternatively, certain extrusion dies, sometimes called tandem extrusion dies, can be used to simultaneously apply multiple polymer layers in a single step. After extrusion with a tandem extrusion die, all of the polymer layers can then be optionally cured in a single curing step.

According to certain embodiments, the compositions described herein can be crosslinked using a suitable process. Suitable silane crosslinking processes can include MONO-SIL™, SIOPLAS™, VISICO™, and AMBICAT™. For example, the described compositions can be crosslinked using a peroxide crosslinking agent and a continuous vulcanization tube, or crosslinked using a silane-grafted copolymer and a moisture curing process. As can be appreciated, such processes can have many variations. For example, silane crosslinking processes can occur in a single-step process which both grafts a silane onto the polymer and crosslinks the polymer. In certain such embodiments, peroxide can be used to initiate the grafting process. In certain embodiments, a method of forming a cable can include crosslinking the composition described herein via a single-step silane crosslinking process.

In other embodiments, a two-step process with separate grafting and crosslinking steps can be used. In such embodiments, the first step can use peroxide to graft silane to polyethylene. In a second step, the silane-grafted polyethylene can then be blended with additional polymer and extruded onto a cable. Crosslinking can occur through exposure to ambient air, hot water, or steam. Heat can be applied during extrusion or in a separate step.

As can be further appreciated however, still other crosslinking methods can also be suitable such as the use of radiation crosslinking, heat crosslinking, electron beam crosslinking, addition crosslinking, or platinum cured crosslinking. Additional details about the above crosslinking methods, and other suitable crosslinking methods are described in U.S. patent application Ser. No. 15/360,521; U.S. Patent App. No. 2015/0376369; and U.S. Patent App. No. 2016/0189829 each incorporated herein by reference.

As can be appreciated, cables can be formed in a variety of configurations including as single-core cables, multi-core cables, tray cables, inter-locked armored cables, and continuously corrugated welded ("CCW") cable constructions. The conductors in such cables can be surrounded by one or more insulation layers and/or jacket layers. According to certain embodiments, one or more of such insulation layers or jacket layers can be formed with the compositions as described herein.

An illustrative, single-core cable is depicted in FIG. 1. The single-core cable in FIG. 1 includes a conductor 5, an insulation layer 10, and a jacket layer 20. Either, or both, of the insulation layer 10 and the jacket layer 20 can be formed of a composition as described herein. As can be appreciated, many variations are possible. For example, cables can be constructed with a plurality of conductors, a composite core, an insulation shield, neutral wires, and/or additional insulation or jacket layers in various embodiments. As can further be appreciated, in certain embodiments, cables can be constructed with an insulation layer only, and no jacket layer.

The conductor, or conductive element, of the cable, can generally include any suitable electrically conducting material. For example, suitable, generally electrically conductive metals can include copper, aluminum, a copper alloy, an aluminum alloy (e.g. aluminum-zirconium alloy), or any other conductive metal. For example, the conductor can be made from a material selected from the group consisting of conducting or non-dielectric materials such as composites, composite alloys, insulated conductors, coated conductors, steel, aluminum, aluminum alloy, aluminum conductor steel-reinforced cable (ACSR), aluminum conductor steel supported cable (ACSS), or aluminum conductor aluminum alloy reinforced cable (ACAR). In another embodiment, the material used in making of the conductor can be selected on the basis of its strengthening properties. It will be appreciated that the conductor in certain embodiments can provide a phase conductor, a neutral conductor, or be non-conductive. As will be appreciated, the conductor can be solid, or can be twisted and braided from a plurality of smaller conductors. In certain embodiments, the conductor can be sized for specific purposes. For example, a conductor can range from a 22 AWG conductor to a 4/0 AWG cable in certain embodiments or can range in diameter from 0.32 mm$^2$ to 108 mm$^2$ in other certain embodiments.

EXAMPLES

Table 1 provides formulations for each of three example covering compositions. Weight percentages of each component are listed. Comparative Example 1 does not include ethylene-octene copolymer, while Inventive Examples 1 and 2 include 20% and 10%, by weight, of ethylene-octene copolymer, respectively. Each of Comparative Example 1 and Inventive Examples 1 and 2 was applied as insulation to a conductor and crosslinked with a single-step silane crosslinking process (i.e., MONOSIL™ process) at ambient temperature. For each of the examples, subsequent to formation, the conductors were removed from the wires, and the extruded tubes of insulation were subjected to testing.

TABLE 1

| Component | Comparative Example A (wt. %) | Inventive Example 1 (wt. %) | Inventive Example 2 (wt. %) |
|---|---|---|---|
| LLDPE | 89.9 | 70 | 81 |
| Processing Aid | 5 | 5 | 5 |
| Silane Coupling Agent Mixture | 1.1 | 1 | 1 |
| Antioxidant Masterbatch | 4 | 4 | 4 |
| Ethylene-Octene Copolymer | 0 | 20 | 10 |
| Properties | | | |
| Tensile Strengh (PSI) | 3622 | 3485 | 3008 |
| Elongation (%) | 648 | 476 | 566 |
| Hot Creep @ 150° C. (%) | 86 | 54 | 96 |
| % SET | −38.9 | 3 | 0 |

Properties were tested for each of Comparative Example A and Inventive Examples 1 and 2. For example, values for tensile strength, elongation at the break, and hot creep were measured according to UL 44 ed. 19 (2018). The "% SET" values shown in Table 1 refer the amount of shrinkback experienced by the example after taking the sample out of the furnace for the Hot Creep Test and letting it cool down for 30 minutes at ambient temperature. Such values are calculated using the following formula:

$$\% \, SET = \frac{L_2 - L_1}{L_1} * 100$$

where $L_1$ is the original length of the sample before the Hot Creep Test and $L_2$ is the length of the sample after cool down following the Hot Creep Test. As shown above, Inventive Examples 1 and 2 outperformed Comparative Example A as Comparative Example A experienced a significant amount of shrinkback relative to Inventive Examples 1 and 2, which did not experience shrinkback.

In certain embodiments, cables including the compositions described herein can exhibit reduced shrinkback by exhibiting a % SET value of about 10% less than compositions without the polyethylene-polyolefin elastomer blend; in certain embodiments, cables including the compositions described herein can exhibit reduced shrinkback by exhibiting a % SET value of about 20% less than compositions without the polyethylene-polyolefin elastomer blend; and in certain embodiments, cables including the compositions described herein can exhibit reduced shrinkback by exhibiting a % SET value of about 30% less than compositions without the polyethylene-polyolefin elastomer blend. In certain embodiments, cables including the compositions described herein can exhibit substantially no shrinkback by exhibiting a % SET value of zero or greater.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising:
   one or more conductors; and
   a covering surrounding the one or more conductors, the covering formed from a composition comprising:
   a single form of polyethylene, the single form of polyethylene consisting of linear low-density polyethylene ("LLDPE"); and
   about 10% to about 20%, by weight, of a polyolefin elastomer comprising one of more of an ethylene-octene copolymer and an ethylene-butene copolymer;
   one or more coupling agents, each of the one or more coupling agents being selected from the group consisting of a monomeric vinyl silane, an oligomeric vinyl silane, a polymeric vinyl silane, and an organosilane compound; and
   an antioxidant;
   wherein the composition is crosslinked; and
   wherein the cable exhibits a % SET value of zero or greater.

2. The cable of claim 1, wherein the composition is crosslinked via a single-step silane crosslinking process.

3. A cable consisting essentially of:
   one or more conductors; and
   a covering surrounding the one or more conductors, the covering formed from a composition comprising:
   a single form of polyethylene, the single form of polyethylene consisting of linear low-density polyethylene ("LLDPE"); and
   about 5% to about 30%, by weight, of a polyolefin elastomer comprising one of more of an ethylene-octene copolymer and an ethylene-butene copolymer;
   a silane coupling agent;
   an antioxidant; and
   optionally a processing aid;
   wherein the composition is crosslinked.

4. The cable of claim 3, wherein the cable exhibits a % SET value of zero or greater.

5. The cable of claim 1, wherein the cable exhibits one or more of a tensile strength of about 3,000 psi or greater or an elongation at break of about 475% or greater.

6. The cable of claim 3, wherein the cable exhibits one or more of a tensile strength of about 3,000 psi or greater or an elongation at break of about 475% or greater.

* * * * *

UNITED STATES PATENT AND TRADEMARK OFFICE
CERTIFICATE OF CORRECTION

PATENT NO. : 11,837,383 B2
APPLICATION NO. : 16/832499
DATED : December 5, 2023
INVENTOR(S) : Elliot Byunghwa Lee et al.

Page 1 of 1

It is certified that error appears in the above-identified patent and that said Letters Patent is hereby corrected as shown below:

On the Title Page

In Column 2, Abstract item (57), change "A cable includes cable one or more" to --A cable includes one or more--;

In the Claims

Claim 1, Column 10, Line 14, change "comprising one of more" to --comprising one or more--; and Claim 3, Column 10, Line 36, change "comprising one of more" to --comprising one or more--.

Signed and Sealed this
Ninth Day of January, 2024

Katherine Kelly Vidal
*Director of the United States Patent and Trademark Office*